S. B. CASTLE.
ELEVATOR.
No. 75,366. Patented Mar. 10, 1868.
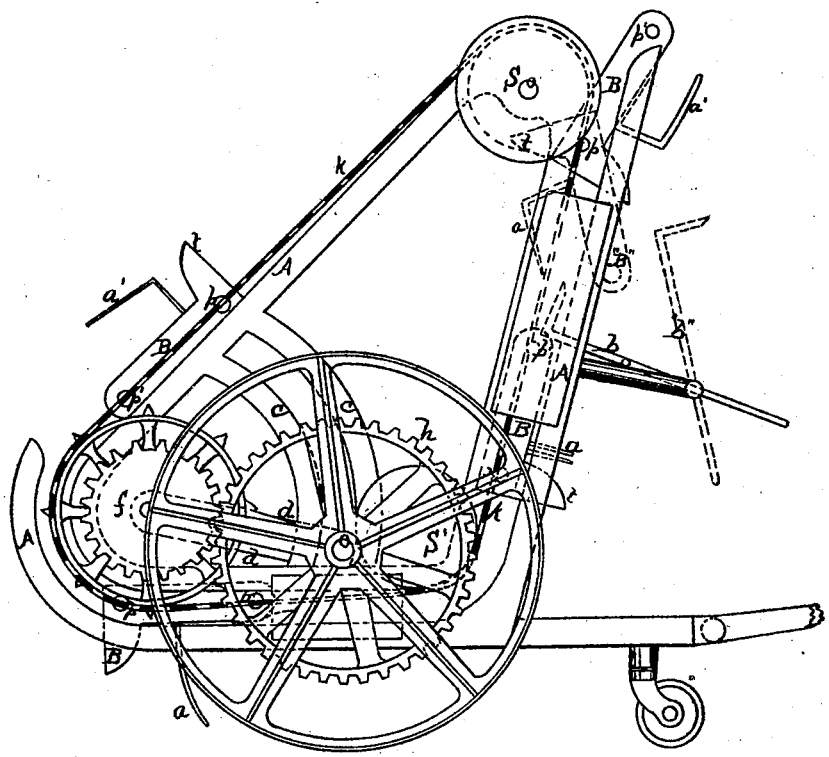
Chas Foster } Witnesses
Ch H Kuhn
Simeon B. Castle
Inventor.

United States Patent Office.

SIMEON B. CASTLE, OF CORTLAND, NEW YORK.

*Letters Patent No. 75,366, dated March 10, 1868.*

IMPROVEMENT IN ELEVATORS.

*The Schedule referred to in these Letters Patent and making part of the same.*

TO ALL WHOM IT MAY CONCERN:

Be it known that I, SIMEON B. CASTLE, of Cortland, in the county of Cortland, and State of New York, have invented a new and useful Improvement in Combined Surface-Elevators; and I do hereby declare that the following is a full, clear, and exact description of the same, reference being had to the accompanying drawings, which make a part of this specification, and which represent a side elevation of the apparatus, the two sides being the same.

The purpose of my invention is to raise hay, stone, earth, or other substance from the surface of the ground and load the same into a wagon, to which the apparatus ordinarily is to be attached, the elevators being changed according to the substance to be raised, the remainder of the apparatus being constant.

A is the frame of the machine, with a groove upon the inner side extending from its rear to the front, and from thence to the top of the frame in front. $c\ c$ are sections of a quadrant, and part of the frame, with their centres the same as that of the pulley $f$, the axle of the driving-wheels passing between $c\ c$, and by means of stop-bolts supporting the frame at any desired height. $o$ is the driving-wheel, upon the inner side of which is the spur-wheel $h$, meshing into the spur-wheel and pulley $f$. Over the pulleys $f$, $s$, and $s'$ runs an endless chain, $k$, which is carried by the projections upon the spur-wheel $f$. B B' "B" are elevators or carriers, the sides of which, or ends, are knee-shaped, and attached to the chains by a cross-rod extending from chain to chain. $p'$ is a knob or projection from the side of the elevator or carrier-head, working in the slot in the frame, and which keeps the carriers in position. In these elevator or carrier-heads are inserted teeth, shovels, or other tools, according to the material to be raised. $b$ is a self-adjusting table, hinged upon a projection of the frame in front, and high enough to tip its load into a wagon.

As the machine moves forward, the carriers move forward under the frame, loading themselves as they advance. They are then raised, tipping the table as each passes, the table falls back in place, and the elevator, when it has been raised far enough to free the knob $p'$ from the slot in the frame, is dumped upon the table, as represented at B. "B" represents the carrier inverted and dumped upon the table. After being inverted, the point of the carrier-head $t$, as the head is carried forward, comes in contact with the cross-rod $o'$, when the head is restored to its former position, and ready again to pass forward and reload.

What I claim, and desire to secure by Letters Patent, is—

1. I claim the slotted frame A, in combination with the cross-head elevators B, for the uses and purposes set forth.

2. I claim the adjustable table $b$, in combination with the elevator-heads, for the purpose described.

3. I claim the quadrant-shaped bars $c'\ c'$, in combination with the frame A and axle of the driving-wheels, for the purpose of raising and lowering the main apparatus.

SIMEON B. CASTLE.

Witnesses:
 CHAS. FOSTER,
 CHAS. W. KINNE.